(12) United States Patent
Matsunaga et al.

(10) Patent No.: US 9,080,534 B2
(45) Date of Patent: Jul. 14, 2015

(54) IDLING STOP CONTROL DEVICE, VEHICLE AND VEHICLE CONTROL METHOD

(75) Inventors: Masaki Matsunaga, Odawara (JP); Junichi Morimura, Suntoh-gun (JP); Yasunari Kido, Hadano (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/363,915

(22) PCT Filed: Dec. 15, 2011

(86) PCT No.: PCT/JP2011/007013
§ 371 (c)(1),
(2), (4) Date: Jun. 9, 2014

(87) PCT Pub. No.: WO2013/088476
PCT Pub. Date: Jun. 20, 2013

(65) Prior Publication Data
US 2014/0345564 A1 Nov. 27, 2014

(51) Int. Cl.
*F02M 3/00* (2006.01)
*F02M 3/02* (2006.01)
*F02N 11/08* (2006.01)
*F02D 17/04* (2006.01)
*F02D 29/02* (2006.01)
*B60W 30/18* (2012.01)

(52) U.S. Cl.
CPC ............ *F02M 3/02* (2013.01); *B60W 30/18072* (2013.01); *B60W 30/18136* (2013.01); *F02D 17/04* (2013.01); *F02D 29/02* (2013.01); *F02N 11/0822* (2013.01); *B60W 2540/12* (2013.01); *B60Y 2300/46* (2013.01); *F02N 2200/102* (2013.01); *Y02T 10/48* (2013.01)

(58) Field of Classification Search
CPC ... F02D 17/04; B60Y 2300/44; B60Y 2300/45; B60W 2540/12; B60W 30/18018; B60W 30/18136; Y02T 10/48
USPC ....................................................... 123/339.1
See application file for complete search history.

(56) References Cited

U.S. PATENT DOCUMENTS

| 6,251,046 B1 * | 6/2001 | Yoshino et al. ................ 477/187 |
| 6,308,129 B1 * | 10/2001 | Uchida ......................... 701/112 |
| 6,358,180 B1 * | 3/2002 | Kuroda et al. ..................... 477/4 |
| 2003/0004635 A1 * | 1/2003 | Kamiya et al. ................. 701/112 |

FOREIGN PATENT DOCUMENTS

| JP | 2004-183519 A | 7/2004 |
| JP | 2005-330813 A | 12/2005 |
| JP | 2007-100625 A | 4/2007 |
| JP | 2008-238988 A | 10/2008 |
| JP | 2009-024660 A | 2/2009 |
| JP | 2009-097944 A | 5/2009 |

* cited by examiner

*Primary Examiner* — Hung Q Nguyen
(74) *Attorney, Agent, or Firm* — Kenyon & Kenyon LLP

(57) ABSTRACT

An idle reduction control device mounted on a vehicle equipped with an engine and a brake comprises: a pumping operation detector that detects a pumping operation of the brake; and an engine controller that controls a start and a stop of the engine. The engine controller stops the engine after elapse of a predetermined time since a stop of the vehicle, when a number of the pumping operations during a deceleration period before the stop of the vehicle is less than a predetermined value.

6 Claims, 5 Drawing Sheets

IDLING STOP CONTROL DEVICE, VEHICLE AND VEHICLE CONTROL METHOD

CROSS-REFERENCE TO RELATED APPLICATIONS

This is a national phase application based on the PCT International Patent Application No. PCT/JP2011/007013 filed Dec. 15, 2011, the entire contents of which are incorporated herein by reference.

TECHNICAL FIELD

The present invention relates to an idle reduction control device mounted on a vehicle equipped with an engine and a brake, a vehicle equipped with an engine and a brake and a vehicle control method of controlling a vehicle equipped with an engine and a brake.

BACKGROUND ART

In the prior art, idle reduction has been known to stop an engine during a stop of a vehicle, such as an automobile, and restart the engine at the time of starting the vehicle, in order to reduce fuel consumption and gas emission during the stop of the vehicle. It is preferable to perform idle reduction when the automobile stops for a relatively long time, for example, when the automobile stops at a traffic light. Idle reduction in the case of a short stop time, for example, during a traffic jam causes a problem that a stop and a restart of the engine are repeated frequently. In order to solve this problem, a variety of techniques have been known to predict, when an automobile stops, whether the stop time is long or short, based on, for example, application of brake, the accelerator opening and the gearshift lever position of the automobile.

For example, Patent Literature 1 discloses an engine control device that stops an engine upon satisfaction of a specified engine stop condition, such as braking operation, wherein a stop of the engine is prohibited when the vehicle speed is less than a predetermined value and no brake pumping operation is detected. Patent Literature 2 discloses a technique that identifies the type of the driver's vehicle stopping operation, such as application of foot brake, application of parking brake or gear shifting, and determines an expected stop time, which is specified in advance corresponding to the type of the vehicle stopping operation.

CITATION LIST

Patent Literatures

PLT 1: JP 2004-183519A
PTL 2: JP 2008-238988A
PTL 3: JP 2007-100625A
PTL 4: JP 2009-097944A

SUMMARY OF INVENTION

Technical Problem

The above prior art, however, has the problem that idle reduction is not performed, for example, when the vehicle stops at a traffic light without a brake pumping operation. Additionally, it is not easy to predict whether the stop time is long or short, based on the type of a vehicle stopping operation, application of foot brake, application of parking brake or gear shifting. There is accordingly still a room for improvement with regard to the technology of idle reduction.

In order to solve the above problems, an object of the invention is to arrange the details of idle reduction control in a vehicle having an idle reduction function, in order to further improve fuel consumption of the vehicle.

Solution to Problem

In order to solve at least part of the problems described above, the invention is implemented by the following embodiments or aspects.

[Aspect 1]

There is provided an idle reduction control device mounted on a vehicle equipped with an engine and a brake, comprising: a pumping operation detector that detects a pumping operation of the brake; and an engine controller that controls a start and a stop of the engine, wherein the engine controller stops the engine after elapse of a predetermined time since a stop of the vehicle, when a number of the pumping operations during a deceleration period before the stop of the vehicle is less than a predetermined value.

When the number of pumping operations during the deceleration period before the stop of the vehicle is less than the predetermined value, this configuration causes the engine to be kept idle until elapse of the predetermined time since the stop of the vehicle and then stops the engine after the elapse of the predetermined time. This improves fuel consumption of the vehicle.

[Aspect 2]

There is provided the idle reduction control device described in Aspect 1, wherein the predetermined time is set to decrease with an increase in the number of the pumping operations during the deceleration period.

When the number of pumping operations during the deceleration period is less than the predetermined value, this configuration sets the time period between the stop of the vehicle and a stop of the engine to decrease with an increase in the number of pumping operations during the deceleration period. This improves fuel consumption of the vehicle.

[Aspect 3]

There is provided the idle reduction control device described in either Aspect 1 or Aspect 2, wherein the engine controller stops the engine before elapse of the predetermined time since the stop of the vehicle, when the number of the pumping operations during the deceleration period is equal to or greater than the predetermined value.

When the number of pumping operations during the deceleration period is equal to or greater than the predetermined value, this configuration stops the engine before the predetermined time has elapsed since the stop of the vehicle. This improves fuel consumption of the vehicle.

[Aspect 4]

There is provided the idle reduction control device described in Aspect 3, wherein the engine controller stops the engine substantially simultaneously at a time the vehicle stops, when the number of the pumping operations during the deceleration period is equal to or greater than the predetermined value.

When the number of pumping operations during the deceleration period is equal to or greater than the predetermined value, this configuration stops the engine simultaneously with a time the vehicle stops. This improves fuel consumption of the vehicle.

[Aspect 5]

There is provided the idle reduction control device described in any of Aspects 1 to 4, wherein the engine controller stops the engine in a case where the predetermined time has elapsed since the stop of the vehicle and the vehicle satisfies a specified engine stop condition, when the number of the pumping operations during the deceleration period is less than the predetermined value.

According to this configuration, the engine controller does not stop the engine when the vehicle does not satisfy the specified engine stop condition. This suppresses the occurrence of a trouble induced by idle reduction.

[Aspect 6]

There is provided a vehicle equipped with an engine and a brake, comprising: a pumping operation detector that detects a pumping operation of the brake; and an engine controller that controls a start and a stop of the engine, wherein the engine controller stops the engine after elapse of a predetermined time since a stop of the vehicle, when a number of the pumping operations during a deceleration period before the stop of the vehicle is less than a predetermined value.

According to this configuration, when the number of pumping operations during the deceleration period before the stop of the vehicle is less than the predetermined value, the vehicle keeps the engine idle until elapse of the predetermined time since the stop of the vehicle and stops the engine after elapse of the predetermined time. This improves fuel consumption of the vehicle.

[Aspect 7]

There is provided a vehicle control method of controlling a vehicle equipped with an engine and a brake, the vehicle control method comprising:

(a) detecting a pumping operation of the brake; and (b) stopping the engine after elapse of a predetermined time since a stop of the vehicle, when a number of the pumping operations during a deceleration period before the stop of the vehicle is less than a predetermined value.

When the number of pumping operations during the deceleration period before the stop of the vehicle is less than the predetermined value, this configuration controls the vehicle to keep the engine idle until elapse of the predetermined time since the stop of the vehicle and to stop the engine after elapse of the predetermined time. This improves fuel consumption of the vehicle.

The invention may be implemented by a variety of aspects: for example, a control system and an automobile including the idle reduction control device described above, a manufacturing method and a manufacturing apparatus of the idle reduction control device, a computer program that causes the computer to implement the functions corresponding to the respective steps of the vehicle control method, a storage medium in which such a computer program is stored.

DESCRIPTION OF EMBODIMENTS

A. First Embodiment

Figure 1:
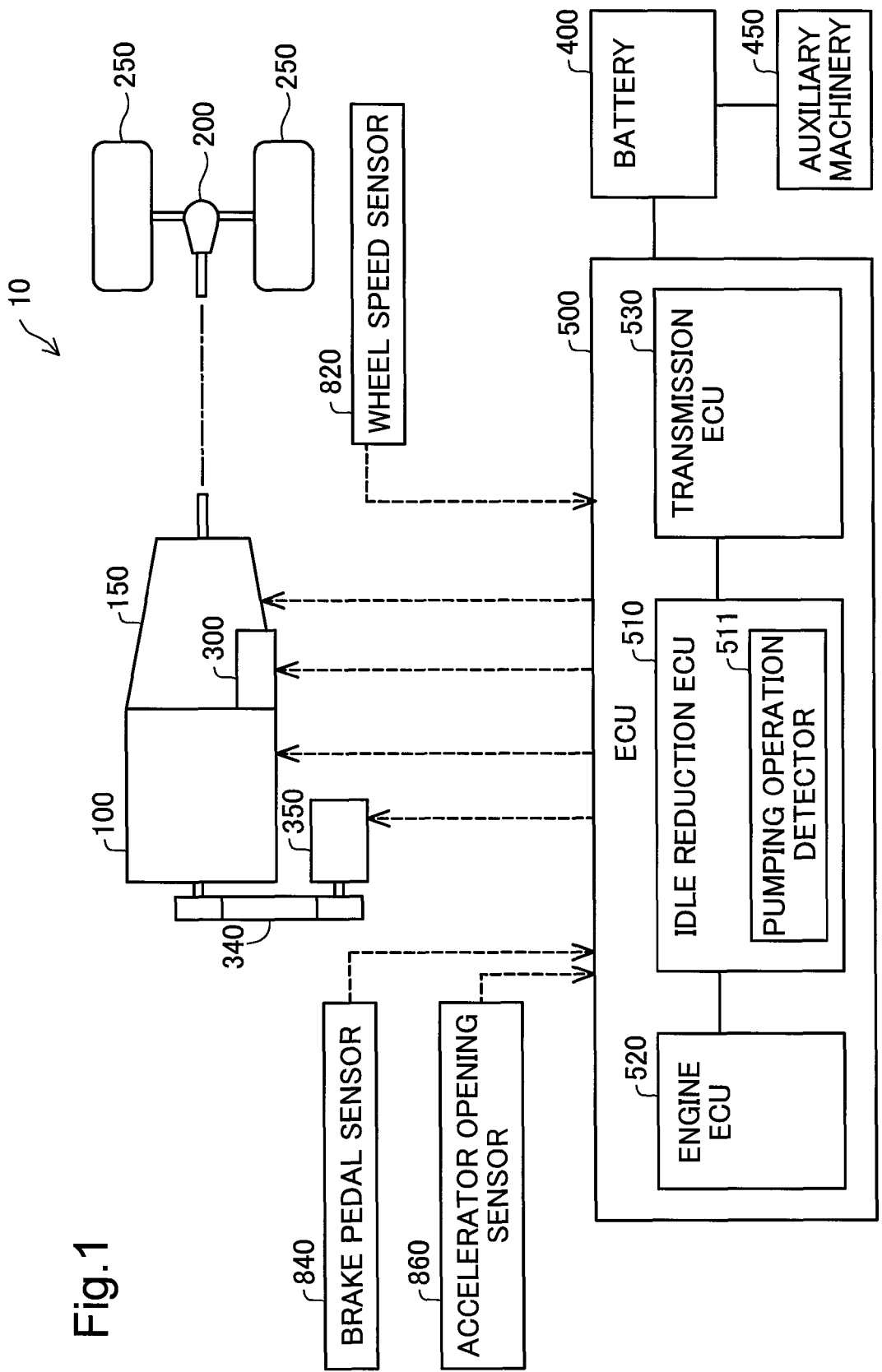
FIG. 1 is a diagram illustrating the configuration of an automobile 10 according to one embodiment of the invention.

FIG. 1 is a diagram illustrating the configuration of an automobile 10 according to an embodiment of the invention. The automobile 10 is a vehicle having idle reduction function. The automobile 10 includes an engine 100, an automatic transmission 150, a differential gear 200, drive wheels 250, a starter 300, an alternator 350, a battery 400 and an electronic control unit (ECU) 500.

The engine 100 is an internal combustion engine that generates power by combustion of a fuel such as gasoline or light oil. The power of the engine 100 is transmitted to the automatic transmission 150, while being transmitted to the alternator 350 via a drive mechanism 340. The output of the engine 100 is changed according to the driver's accelerator pedal operation by the electronic control unit 500.

The automatic transmission 150 automatically changes the gear ratio (so-called gear shifting). The power (rotation speed·torque) of the engine 100 is subjected to gear shifting by the automatic transmission 150 and is transmitted as a desired rotation speed·torque via the differential gear 200 to the left and right drive wheels 250. The power of the engine 100 is accordingly changed according to the accelerator pedal operation and is transmitted via the automatic transmission 150 to the drive wheels 250 to accelerate or decelerate the vehicle (automobile 10).

The starter 300 is a self starter to start the engine 100 with electric power supplied from the battery 400. In general, when the driver operates a non-illustrated ignition switch to start driving an automobile at a stop, the starter 300 is activated to start the engine 100. This starter 300 may be used to restart the engine 100 in the no idling state. The no idling state denotes the state that the engine 100 stops by idle reduction control described later.

The alternator 350 uses part of the power of the engine 100 to generate electric power. The generated electric power is used to charge the battery 400 via a non-illustrated inverter. This alternator 350 may be used to restart the engine 100 in the no idling state. The drive mechanism 340 is provided as a mechanical section to transmit the power of the engine 100 to the alternator 350, and a belt drive is employed herein as the drive mechanism 340. The battery 400 is a lead acid battery serving as a DC power source for a voltage of 14 V and supplies electric power to auxiliary machinery 450. The automobile 10 has lamps and lights, windshield wipers and an air conditioner (A/C) as the auxiliary machinery 450.

The electronic control unit 500 is configured to include an idle reduction ECU 510, an engine ECU 520 and a transmission ECU 530. Each of the ECUs 510, 520 and 530 is implemented by a computer including a CPU, a ROM and a RAM. The electronic control unit 500 may optionally include ECUs other than those described above, for example, an auxiliary machinery drive motor ECU to drive the auxiliary machinery 450 during stop of the engine 100. The respective ECUs 510, 520 and 530 receive supplies of electric power from the battery 400. The electronic control unit 500 corresponds to the "idle reduction control device" in the claims.

The idle reduction ECU 510 performs idle reduction control. The idle reduction control is performed to stop or restart the engine upon satisfaction of predetermined conditions. The specific details of the idle reduction control will be described later with reference to FIGS. 2 to 4. The idle reduction ECU 510 is connected with the engine ECU 520 and the transmission ECU 530 via signal lines in such a manner as to allow two-way communication. The idle reduction ECU 510 is also connected via signal lines with a wheel speed sensor 820 that detects the rotation speed of the drive wheels 250, a brake pedal sensor 840 that detects a brake pedal operation as a braking amount and an accelerator opening sensor 860 that detects an accelerator pedal operation as an accelerator opening. In the idle reduction ECU 510, a computer program that causes the CPU to perform the idle reduction control and a computer program that causes the CPU to implement the functions as a pumping operation detector 511 are stored in the ROM. The pumping operation detector 511 detects the driver's brake pumping operations in idle reduction control. The detection method of the brake pumping operations will be described later.

Figure 2:
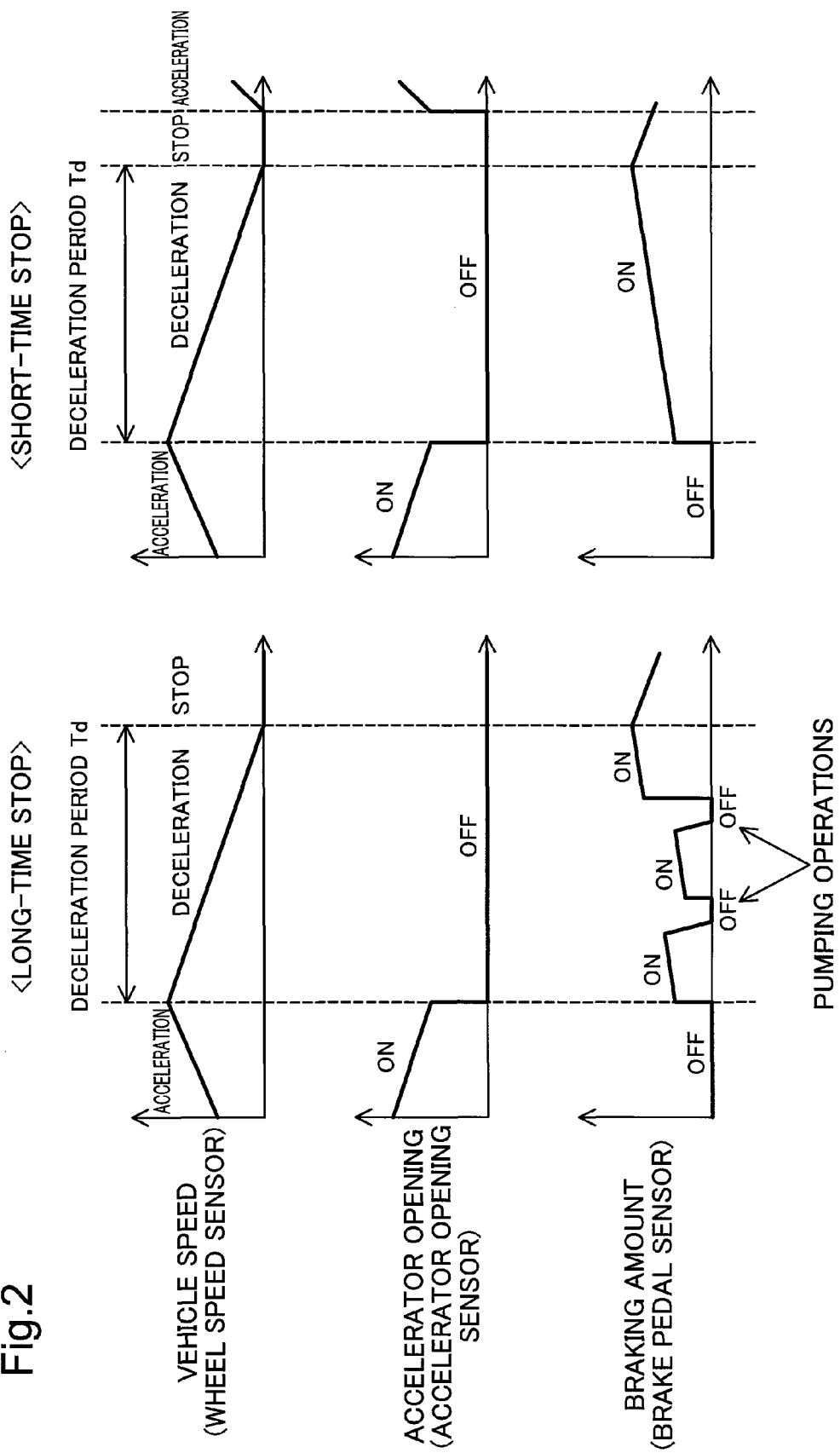
FIG. 2 is a diagram illustrating the details of idle reduction control.

The idle reduction ECU 510 has a counter that counts the number of pumping operations detected by the pumping operation detector 511 during a deceleration period Td before the vehicle stops (FIG. 2). Hereinafter the number of pumping operations counted by the idle reduction ECU 510 is also called count value Nc. In idle reduction control, the idle reduction ECU 510 changes the timing to stop the engine after the vehicle stops, according to the count value Nc.

The engine ECU 520 is connected via signal lines with the wheel speed sensor 820, the accelerator opening sensor 860 and a non-illustrated engine rotation speed sensor. The engine ECU 520 adjusts, for example, the amount of fuel injection and the throttle opening based on the information detected by these sensors, so as to control the operating conditions of the engine 100. When the vehicle stops, the engine ECU 520 stops fuel injection to the engine 100 to stop the operation of the engine 100, in response to a request from the idle reduction ECU 510. On a start of the vehicle, the engine ECU 520 controls the starter 300 or the alternator 350 to start the engine 100, in response to a request from the idle reduction ECU 510. The engine ECU 520 corresponds to the "engine controller" in the claims.

The transmission ECU 530 is connected via signal lines with the wheel speed sensor 802, the accelerator opening sensor 860 and a non-illustrated shift position sensor. The transmission ECU 530 controls a non-illustrated hydraulic actuator based on the information detected by these sensors, so as to change the gear ratio of the automatic transmission 150.

FIG. 2 is a diagram illustrating the details of idle reduction control. The idle reduction ECU 510 predicts whether a stop time of the vehicle after the deceleration period Td is a long time period (hereinafter referred to as "long-time stop") or a short time period (hereinafter referred to as "short-time stop"), based on the number of brake pumping operations during the deceleration period Td before the automobile 10 stops. The pumping operation denotes the driver's operation of stepping on the brake pedal during deceleration.

In general, idle reduction control denotes control of stopping the idle engine during deceleration or during stop of the automobile for the purpose of reduction of fuel consumption. When the vehicle stop time is short (for example, about 5 [s]), the amount of fuel consumption required to restart the engine may become greater than the amount of fuel consumption reduced by stopping the engine, which results in increasing the total amount of fuel consumption. A preferable procedure of idle reduction control accordingly predicts whether a vehicle stop after the deceleration period Td is a long-time vehicle stop (for example, 10 [s] to several [min]) or a short-time vehicle stop (for example, 5 [s] or less) and stops the engine only in the case of a long-time vehicle stop.

The long-time vehicle stop includes various vehicle stops that require adjustment of the vehicle stop position to a specified position, for example, a vehicle stop at a traffic light or a vehicle stop for parking. The specified position herein means a position specified, for example, by a white line on the road or by another automobile in front. During the deceleration period Td prior to a long-time vehicle stop, the driver performs fine braking operations, i.e., brake pumping operations, in order to adjust the stop position of the automobile to the specified position.

The short-time vehicle stop, on the other hand, includes stops that do not require adjustment of the vehicle stop position to a specified position, for example, a vehicle stop in a traffic jam or specifically a vehicle stop to adjust the speed of the automobile to the conditions of external environments including another automobile in front. During the deceleration period Td prior to a short-time vehicle stop, there is basically no need of pumping operations, since the driver applies the brake for the purpose of speed adjustment. In consideration of the foregoing, the idle reduction control of the embodiment predicts whether the stop of the vehicle is a long-time stop or a short-time stop, based on the frequency of pumping operations during the deceleration period Td. Upon prediction of a long-time vehicle stop, the idle reduction control stops the engine substantially simultaneously at the time when the vehicle stops. Upon prediction of a short-time vehicle stop, on the other hand, the idle reduction control does not stop the engine at the time when the vehicle stops. Even on prediction of a short-time vehicle stop, when the vehicle does not start after elapse of a certain time period, it is presumed that the stop of the vehicle is a long-time stop. The idle reduction control accordingly stops the engine after elapse of a predetermined time since the stop of the vehicle. The flow of idle reduction control according to the invention is described below with reference to FIGS. 3 and 4.

Figure 3:
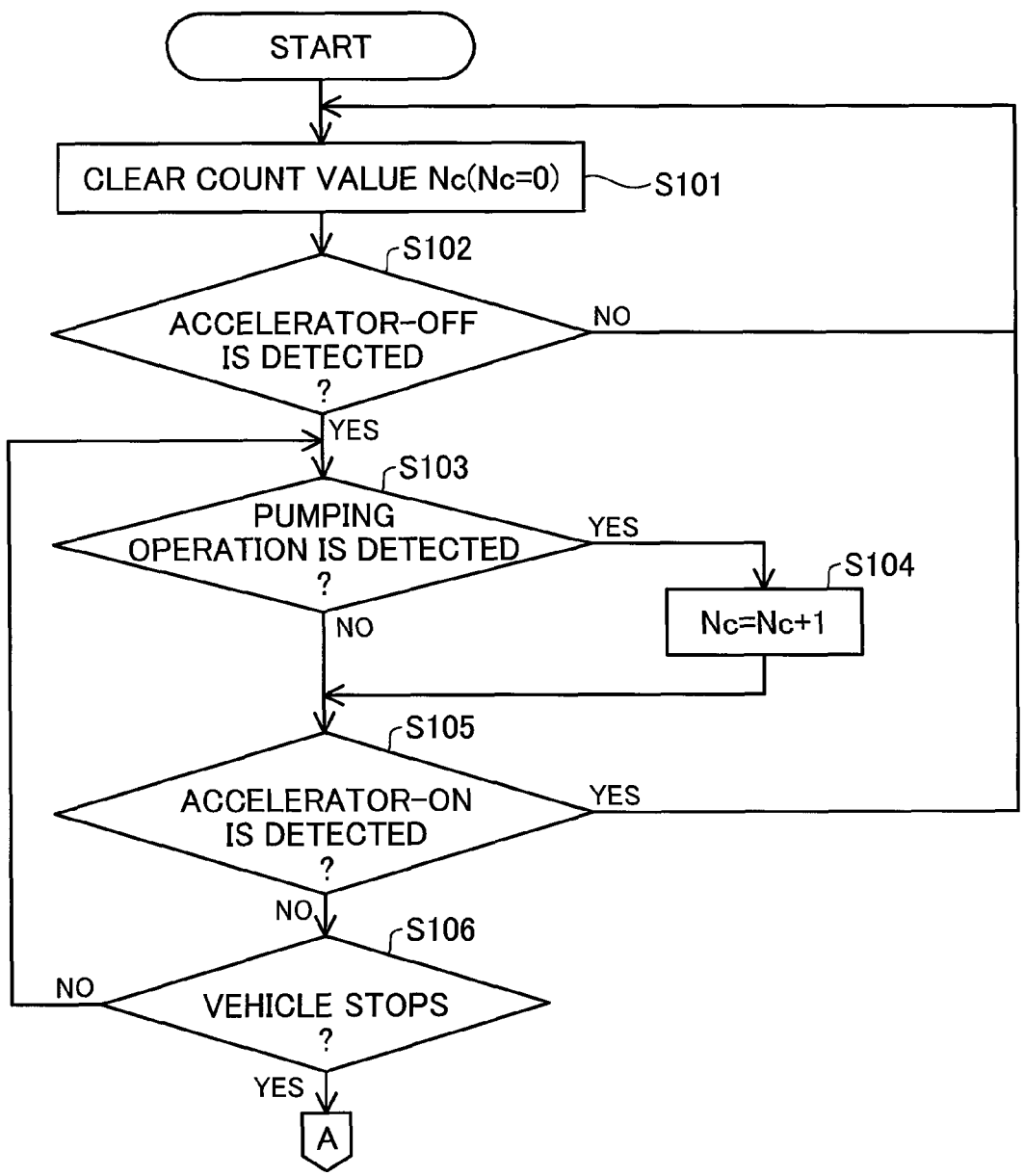
FIG. 3 is a flowchart illustrating a flow of idle reduction control.
Figure 4:
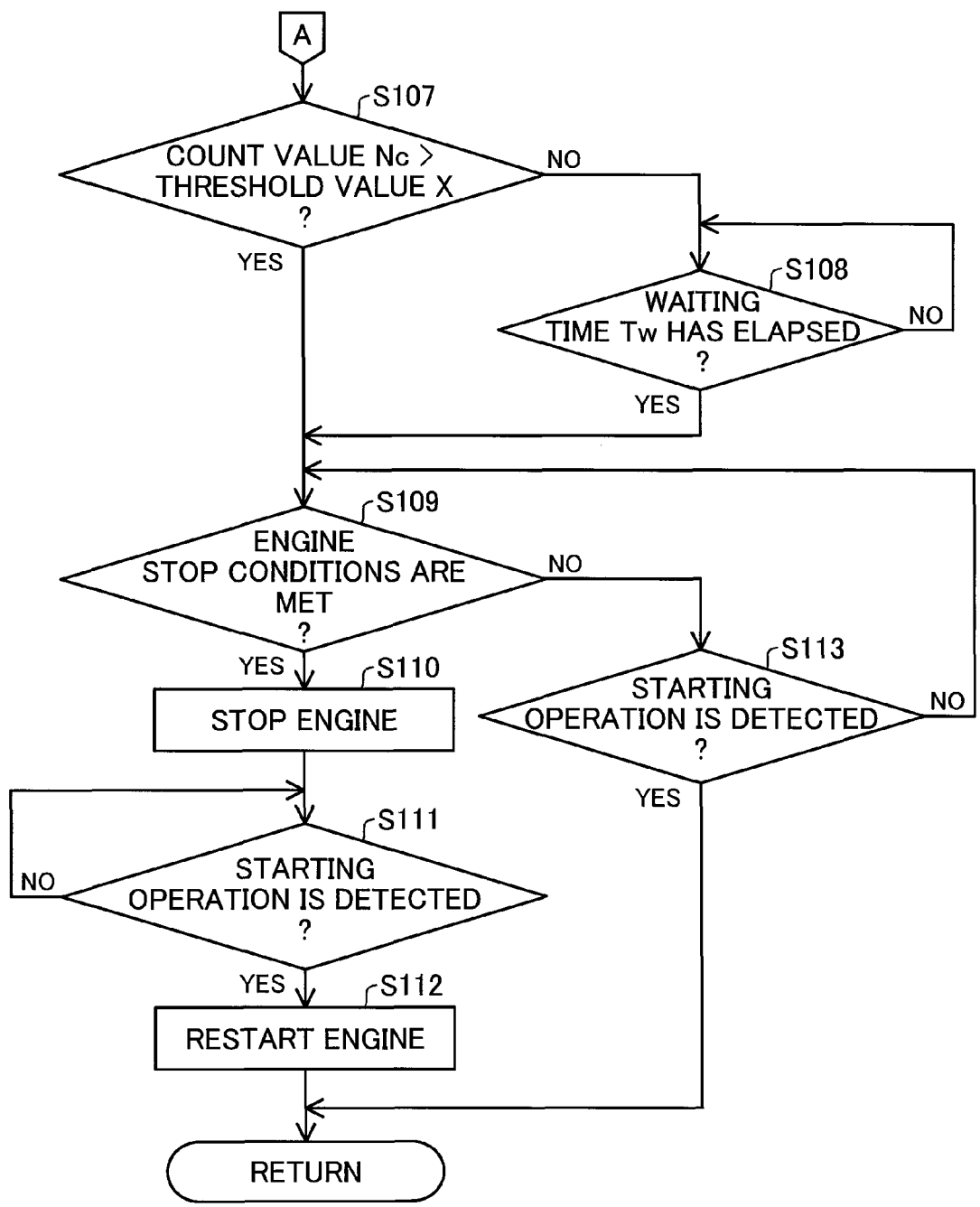
FIG. 4 is a flowchart illustrating the flow of idle reduction control.

FIGS. 3 and 4 are flowcharts illustrating a flow of idle reduction control. The idle reduction ECU 510 performs the routine of FIGS. 3 and 4 repeatedly at predetermined intervals. The following description is on the assumption that the automobile 10 is running. The idle reduction ECU 510 clears the count value Nc (Nc=0) (step S101) and subsequently detects whether the driver releases the accelerator pedal to make the state that the accelerator pedal is released (hereinafter referred to as "accelerator-OFF") (step S102). The idle reduction control ECU 510 detects an accelerator-OFF, based on the accelerator opening detected by the accelerator opening sensor 860.

Upon no detection of an accelerator-OFF (step S102: NO), i.e., upon detection of the state that the accelerator pedal is stepped on (hereinafter referred to as "accelerator-ON") based on the accelerator opening detected by the accelerator opening sensor 860, it is contemplated that the automobile 10 is running and does not enter the deceleration period Td (FIG. 2). The idle reduction ECU 510 accordingly repeats steps S101 and S102 until detection of an accelerator-OFF.

Upon detection of an accelerator-ON (step S102: YES), it is contemplated that the automobile 100 enters the deceleration period Td. The pumping operation detector 511 of the idle reduction ECU 510 then detects a brake pumping operation (step S103). The pumping operation detector 511 detects a pumping operation using a change in braking amount detected by the brake pedal sensor 840. More specifically, the pumping operation detector 511 detects a pumping operation by detecting an edge of a change in braking amount on the occasion of a switchover from the state that the brake pedal is stepped on (hereinafter referred to as "brake-ON") to the state that the brake pedal is released (hereinafter referred to as "brake-OFF"). Another procedure of detecting a pumping operation may detect a pumping operation when a time period between detection of a brake OFF and detection of another brake OFF is shorter than a predetermined time. Detection of a pumping operation is not limited to the method using the braking amount detected by the brake pedal sensor 840 but may be performed by another method using, for example, a change in brake hydraulic pressure or a physical displacement of the brake pedal.

Upon detection of a pumping operation by the pumping operation detector 511 (step S103: YES), the idle reduction ECU 510 increments the counter by one (Nc=Nc+1) (step S104). Upon no detection of a pumping operation (step S103: NO), on the other hand, the idle reduction ECU 510 skips the process of step S104. The idle reduction ECU 510 subsequently detects an accelerator-ON, based on the accelerator opening detected by the accelerator opening sensor 860 (step S105).

Upon detection of an accelerator-ON (step S105: YES), it is contemplated that the automobile 10 temporarily enters the deceleration period Td but the deceleration is not for the purpose of stopping the vehicle. The idle reduction ECU 510 accordingly clears the count value Nc (Nc=0) (step S101) and detects an accelerator-OFF again (step S102). Upon no detection of an accelerator-ON (step S105: NO), on the other hand, it is contemplated that the automobile 10 continues the deceleration period Td since the accelerator is kept OFF. The idle reduction ECU 510 accordingly determines whether the automobile 10 stops (step S106). The idle reduction ECU 510 uses the rotation speed of the drive wheels 250 detected by the wheel speed sensor 820 to determine whether the automobile 10 stops.

When the automobile 10 does not stop (step S106: NO), it is contemplated that the automobile 10 is still during deceleration and there is a possibility that the driver performs a brake pumping operation again. The process flow accordingly returns to step S103 at which the pumping operation detector 511 detects a brake pumping operation again (step S103). When the automobile 10 stops (step S106: YES), on the other hand, it is contemplated that the deceleration period Td is terminated. The idle reduction ECU 510 then determines whether the count value Nc representing the pumping number during the deceleration period Td is greater than a threshold value X (step S107, FIG. 4). The threshold value X (for example, X=2 to 5) is arbitrarily set and is stored in advance in the ROM of the idle reduction ECU 510.

When the count value Nc is equal to or less than the threshold value X (step S107: NO), the stop of the automobile 10 is predicted as a short-time stop. The idle reduction ECU 510 accordingly does not allow the engine 100 to stop until elapse of a waiting time Tw (for example, Tw=1 to 9 [s]) (step S108). After elapse of the waiting time Tw (step S108: YES), the idle reduction ECU 510 determines whether engine stop conditions for allowing the engine 100 to stop are satisfied (step S109). As a result of determination, when the automobile 10 satisfies the engine stop conditions (step S109: YES), the idle reduction ECU 510 stops the engine 100 (step S110). As described above, the idle reduction ECU 510 delays a stop of the engine 100 after a stop of the vehicle, when the stop of the automobile 10 is predicted as a short-time stop. More specifically, the idle reduction ECU 510 keeps the engine 100 idle until elapse of the waiting time Tw after a stop of the automobile 10 and subsequently stops the engine 100. The waiting time Tw is set arbitrarily. The waiting time Tw corresponds to the "predetermined time" in the claims.

The engine stop conditions at step S109 are conditions to allow the engine 100 to stop and are set arbitrarily. The engine stop conditions may be, for example, that the gear shift position is in a specified range, the battery 400 has a sufficient capacity, and the brake is ON. In order to stop the engine 100, at step S110, the idle reduction ECU 510 requests the engine ECU 520 to stop the engine 100. When receiving the request, the engine ECU 520 cuts off the supply of fuel to the engine 100 to stop the engine 100.

The description goes back to step S107. When the count value Nc is greater than the threshold value X (step S107: YES), the stop of the automobile 10 is predicted as a long-time stop. The idle reduction ECU 510 accordingly determines whether the engine stop conditions are satisfies (step S109) without any delay time. As a result of determination, when the automobile 10 satisfies the engine stop conditions (step S109: YES), the idle reduction ECU 510 stops the engine 100 (step S110). As described above, the idle reduction ECU 510 stops the engine 100 substantially simultaneously at the time when the automobile 10 stops, when the stop of the automobile 10 is predicted as a long-time stop.

After the engine 100 stops, the idle reduction ECU 510 keeps the engine 100 stopped until detection of a driver's starting operation (step S111: NO). The starting operation denotes an operation performed by the driver to start the automobile 10, for example, a brake-OFF, an accelerator-ON and a change in gear shift position. When detecting a starting operation (step S111: YES), the idle reduction ECU 510 restarts the engine 100 (step S112). More specifically, the idle reduction ECU 510 requests the engine ECU 520 to restart the engine 100. When receiving the request, the engine ECU 520 drives the starter 300 or the alternator 350 to restart the engine 100. The process flow then returns to step S101.

When the engine stop conditions are not satisfied at step S109 (step S109: NO), the idle reduction ECU 510 determines whether the engine stop conditions are satisfied (step S109) until detection of a driver's starting operation (step S113: NO). When a driver's starting operation is detected (step S113: YES) during this process, the process flow returns to step S101. This is the flow of idle reduction control.

The electronic control unit 500 of the embodiment described above stops the engine 100 after elapse of the waiting time Tw since a stop of the automobile 10, when the number of pumping operations is less than the predetermined value during the deceleration period Td prior to the stop of the automobile 10. This improves fuel consumption of the automobile. As described above, it is contemplated that the number of pumping operations during the deceleration period Td is related to the subsequent vehicle stop time. When the stop of the vehicle is predicted as a long-time stop based on the number of pumping operations, the electronic control unit 500 immediately stops the engine after a stop of the vehicle, thus reducing fuel consumption during a stop of the vehicle. When the stop of the vehicle is predicted as a short-time stop, on the other hand, the electronic control unit 500 does not stop the engine but keeps the engine idle, thus eliminating fuel consumption required for a restart and reducing an increase in fuel consumption. In rare cases, even in the state of the less number of pumping operations during the deceleration period Td, the actual vehicle stop may become a long-time stop. The idle reduction control of the embodiment stops the engine 100 after elapse of the waiting time Tw since a stop of the vehicle, when the stop of the vehicle is predicted as a short-time stop. In the case of a short-time stop when the actual stop time is less than the waiting time Tw, the idle reduction control enables the engine to be kept idle. In the case of a long-time stop when the actual stop time exceeds the waiting time Tw, on the other hand, the idle reduction control causes the engine to be stopped after the waiting time. Even when the actual vehicle stop is a long-time stop, such control reduces unnecessary idling and improves fuel consumption.

The technology of identifying the need for idle reduction at the time when the automobile stops has been known in the prior art. For example, a known technique detects the own vehicle position using sensors and GPS and identifies whether the own vehicle position is a location that requires idle reduction during a stop (for example, JP 2007-100625A and JP 2009-097944A). For detection of the own vehicle position, however, there is a need to install the sensors and GPS in the automobile, separately from the ECU performing the general idle reduction control. This disadvantageously increases the cost. The configuration of the embodiment is, however, implemented by the ECU performing the general idle reduction control by simply changing the details of the idle reduction control. The configuration of the embodiment is thus implemented at a low cost.

B. Second Embodiment

A second embodiment describes a configuration of the idle reduction control (FIGS. 3 and 4) that varies the waiting time Tw according to the count value Nc. The general configuration of the automobile 10 is the same as that of the first embodiment and is thus not specifically described here. The idle reduction ECU 510 of the second embodiment stores an Nc-Tw relation table representing a relationship between the count value Nc and the waiting time Tw in the ROM.

Figure 5:
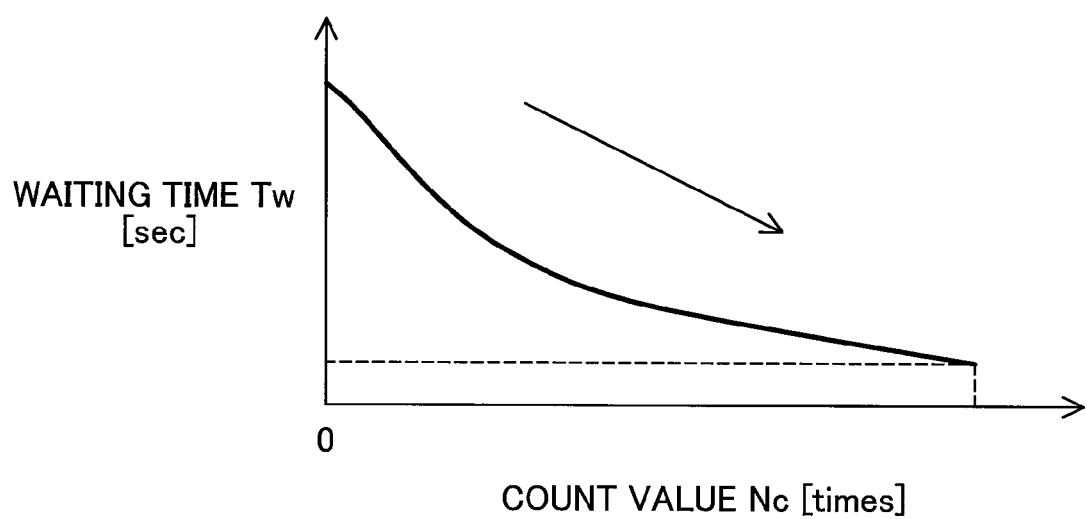
FIG. 5 is a diagram illustrating the details of an Nc-Tw relation table.

FIG. 5 is a diagram illustrating the details of the Nc-Tw relation table. The abscissa of FIG. 5 shows the count value Nc, and the ordinate shows the waiting time Tw. As shown in FIG. 5, the Nc-Tw relation table is arranged such that the waiting time Tw decreases with an increase in count value Nc. For example, the Nc-Tw relation table is arranged, such that the waiting time Tw is 5 [s] at the count value Nc of 0 and is 1 [s] at the count value Nc of 5. In idle reduction control of the second embodiment, at step S108 (FIG. 4), the idle reduction ECU 510 refers to the Nc-Tw relation table, computes the waiting time Tw from the count value Nc and subsequently determines whether the computed waiting time Tw has elapsed. Otherwise the process flow is the same as that of the idle reduction control described in the first embodiment.

The electronic control unit 500 of the second embodiment described above decreases the waiting time Tw with an increase in the number of pumping operations during the deceleration period Td, when the stop of the vehicle is predicted as a short-time stop. This improves fuel consumption of the vehicle. Even when the stop of a vehicle is predicted as a short-time stop based on the less frequency of pumping operations during the deceleration period Td, an increase in the number of pumping operations increases the likelihood that the actual stop of the vehicle is a long-time stop. Decreasing the waiting time Tw with this increase thus further reduces fuel consumption during a stop of the vehicle.

C. Modifications

The present invention is not limited to the embodiments or aspects described above but may be implemented by various other aspects within the scope of the invention. Some examples of possible modifications are given below.

C-1. Modification 1

According to the above embodiments, the idle reduction ECU 510 determines whether the automobile 10 stops at step S106 in idle reduction control (FIG. 3). Alternatively, the idle reduction control may determine whether the speed of the automobile 10 is reduced to or below a predetermined speed (>0). In other words, the idle reduction ECU 510 may stop the engine 100 in the state that the automobile 10 does not stop. In this modification, at step S108, the idle reduction ECU 510 may define the waiting time Tw as a time elapsed since the speed of the automobile 10 goes down to the predetermined speed or may define as a time elapsed since a stop of the automobile 10.

C-2. Modification 2

According to the above embodiments, when the stop of the automobile 10 is predicted as a long-time stop at step S107 in idle reduction control (FIG. 4), the idle reduction control stops the engine 100 substantially simultaneously at the time when the automobile 10 stops. One modification may provide a waiting time between a stop of the automobile 10 and a stop of the engine 100 even upon prediction of a long-time vehicle stop. This waiting time is preferably shorter than the waiting time Tw upon prediction of a short-time vehicle stop. This modification stops the engine earlier upon prediction of a long-time vehicle stop than that upon prediction of a short-time vehicle stop. This improves fuel consumption.

C-3. Modification 3

According to the above embodiments, it is determined whether the count value Nc is greater than the threshold value X at step S107 in idle reduction control (FIG. 4). By arranging the Nc-Tw relation table described in the second embodiment such that the waiting time Tw is 0 [s] at the count value Nc equal to or greater than a specified value (for example, 6), the process flow may be configured to always go through step S108 with omission of step S107. In this modification, the idle reduction ECU 510 refers to the Nc-Tw relation table and computes the waiting time Tw equal to 0 [s] upon prediction of a long-time vehicle stop, thus causing the engine to be stopped immediately after a stop of the vehicle.

C-4. Modification 4

According to the above embodiments, it is determined whether the engine stop conditions are satisfied at step S109 in idle reduction control (FIG. 4). This step S109 may, however, be omitted.

C-5. Modification 5

The embodiments illustrate the automobile 10 as an example of the vehicle. The vehicle is, however, not limited to the automobile but may be other than an automobile, for example, a train. The automobile 10 includes the automatic transmission 150 according to the above embodiments, but alternatively the automobile 10 may include a manual transmission.

C-6. Modification 6

Part of the functions implemented by the software according to the above embodiments may be implemented by hardware (for example, integrated circuit), or part of the functions implemented by hardware may be implemented by software.

REFERENCE SIGNS LIST

10 Automobile
100 Engine
150 Automatic transmission
200 Differential gear
250 Drive wheels

300 Starter
340 Drive mechanism
350 Alternator
400 Battery
450 Auxiliary machinery
500 Electronic control unit
510 Idle reduction ECU
511 Pumping operation detector
520 Engine ECU
530 Transmission ECU
820 Wheel speed sensor
840 Brake pedal sensor
860 Accelerator opening sensor

The invention claimed is:

1. An idle reduction control device mounted on a vehicle equipped with an engine and a brake, comprising:
 a pumping operation detector that detects a pumping operation of the brake; and
 an engine controller that controls a start and a stop of the engine,
 wherein the engine controller stops the engine after elapse of a predetermined time since a stop of the vehicle, when a number of the pumping operations during a deceleration period before the stop of the vehicle is less than a predetermined value, and
 the engine controller stops the engine before elapse of the predetermined time since the stop of the vehicle, when the number of the pumping operations during the deceleration period is equal to or greater than the predetermined value.

2. The idle reduction control device according to claim 1, wherein
 the predetermined time is set to decrease with an increase in the number of the pumping operations during the deceleration period.

3. The idle reduction control device according to claim 1, wherein
 the engine controller stops the engine substantially simultaneously at a time the vehicle stops, when the number of the pumping operations during the deceleration period is equal to or greater than the predetermined value.

4. The idle reduction control device according to claim 1, wherein
 the engine controller stops the engine in a case where the predetermined time has elapsed since the stop of the vehicle and the vehicle satisfies a specified engine stop condition, when the number of the pumping operations during the deceleration period is less than the predetermined value.

5. A vehicle equipped with an engine and a brake, comprising:
 a pumping operation detector that detects a pumping operation of the brake; and
 an engine controller that controls a start and a stop of the engine,
 wherein the engine controller stops the engine after elapse of a predetermined time since a stop of the vehicle, when a number of the pumping operations during a deceleration period before the stop of the vehicle is less than a predetermined value, and
 the engine controller stops the engine before elapse of the predetermined time since the stop of the vehicle, when the number of the pumping operations during the deceleration period is equal to or greater than the predetermined value.

6. A vehicle control method of controlling a vehicle equipped with an engine and a brake, the vehicle control method comprising:
 (a) detecting a pumping operation of the brake; and
 (b) stopping the engine after elapse of a predetermined time since a stop of the vehicle, when a number of the pumping operations during a deceleration period before the stop of the vehicle is less than a predetermined value, and stopping the engine before elapse of the predetermined time since the stop of the vehicle, when the number of the pumping operations during the decelerations period is equal to or greater than the predetermined value.

* * * * *